United States Patent [19]
Yamada et al.

[11] Patent Number: 5,706,969
[45] Date of Patent: Jan. 13, 1998

[54] INSULATED CONTAINER, INSULATING MATERIAL, AND MANUFACTURING METHOD OF THE INSULATED CONTAINER

[75] Inventors: Masashi Yamada; Seiichi Ito; Yasuhiko Komiya, all of Tokyo, Japan

[73] Assignee: Nippon Sanso Corporation, Tokyo, Japan

[21] Appl. No.: 410,885

[22] Filed: Mar. 27, 1995

[51] Int. Cl.$^6$ .................. B65D 30/08; B65D 81/20
[52] U.S. Cl. .................. 220/422; 220/423; 220/DIG. 9; 206/522; 206/523; 383/110
[58] Field of Search ................. 220/421, 422, 220/423, DIG. 9; 215/13.1; 383/3, 110; 206/522, 523

[56] References Cited

U.S. PATENT DOCUMENTS

| | | | |
|---|---|---|---|
| 2,643,021 | 6/1953 | Freedman | 215/13.1 X |
| 3,029,967 | 4/1962 | Morrison | 220/DIG. 9 X |
| 3,695,483 | 10/1972 | Pogorski | 220/422 |
| 3,730,240 | 5/1973 | Presnick | 383/110 X |
| 4,569,082 | 2/1986 | Ainsworth | 383/110 X |
| 4,669,632 | 6/1987 | Kawasaki et al. | 220/423 |
| 4,755,064 | 7/1988 | Weber | 383/110 |
| 5,180,060 | 1/1993 | Forti et al. | 383/3 X |
| 5,217,131 | 6/1993 | Andrews | 383/3 X |
| 5,246,114 | 9/1993 | Underwood | 383/3 X |
| 5,329,778 | 7/1994 | Padamsee | 215/13.1 X |
| 5,445,274 | 8/1995 | Pharo | 383/3 X |
| 5,450,948 | 9/1995 | Beausoliel et al. | 206/523 |

FOREIGN PATENT DOCUMENTS

| | | | |
|---|---|---|---|
| 85534 | 8/1983 | European Pat. Off. | 383/110 |
| 301148 | 2/1989 | European Pat. Off. | 383/110 |
| 2361850 | 3/1978 | France . | |
| 2641484 | 3/1978 | Germany | 383/110 |
| 2854846 | 8/1979 | Germany | 220/DIG. 9 |
| 33 37 200 | 5/1985 | Germany . | |
| 38 20 310 | 12/1989 | Germany . | |
| 7401024 | 1/1974 | Netherlands | 220/422 |
| 1122663 | 8/1968 | United Kingdom . | |
| 2 085 401 | 4/1982 | United Kingdom . | |
| 2163724 | 3/1986 | United Kingdom | 383/110 |
| WO A 85 03422 | 8/1985 | WIPO . | |
| 9113818 | 9/1991 | WIPO | 220/DIG. 9 |

*Primary Examiner*—Sue A. Weaver
*Attorney, Agent, or Firm*—Darby & Darby

[57] ABSTRACT

The present invention relates to an insulated container used for example as a cooler box, a thermos flask or an insulated lunch box, a suitable insulating material for such a container and a method for its manufacture. The insulated container of the present invention is made with an insulating layer between inner and outer walls of a double walled container with the inner and outer walls joined together as one, and has an insulating material, made by filling a bag with a low thermal conductivity gas comprising at least one of gases such as Xenon, Krypton and Argon, disposed between the inner and outer walls. The method of manufacturing the insulated container involves the steps of inserting a bag into the space of the double walled container, filling the bag inserted into the space with a low thermal conductivity gas, and then sealing the bag.

8 Claims, 6 Drawing Sheets

INSULATED CONTAINER, INSULATING MATERIAL, AND MANUFACTURING METHOD OF THE INSULATED CONTAINER

BACKGROUND OF THE INVENTION

The present invention relates to an insulated container used for example as a cooler box, a thermos bottle or an insulated lunch box, a suitable insulating material for such a container and a method for its manufacture. More particularly the present invention relates to an insulated container wherein an insulating material, made by filling a gas having a lower thermal conductivity than that of air into a bag having gas barrier properties, is disposed between inner and outer walls of a double walled container having inner the outer walls joined together as one. The invention also relates to the insulating material used in the container and the method of manufacturing the container.

Heretofore, there have been available insulated containers such as cooler boxes made with inner and outer walls of a synthetic resin, with the space between the inner and outer walls filled with, an organic foam material such as rigid urethane foam or polystyrene foam, or an inorganic powder such as perlite, to thereby form an insulating layer.

Moreover there are also available insulated containers wherein the inner and outer wall are made from a metal material, with the space between forming a vacuum insulating layer.

However, with the former insulated container which is filled with an insulating material such as foam, since the thermal conductivity of the insulating material is high, then a thick insulating layer is required to increase the insulating performance of the container. Moreover, when filling the foam material and the like into the space between the inner and outer walls, the insulating layer must be of a predetermined thickness to enable an efficient filling operation. As a result, the insulating layer must be made from 5 to 10 times thicker than that for an insulated container having a vacuum insulating layer. Therefore, in the case of insulated containers filled with an insulating material, the volumetric efficiency, namely, the ratio of the inside container volume to the total volume with the opening closed, is reduced, so that such containers are generally not suitable for portable use.

With the latter insulated container having a vacuum insulating layer, excellent insulating performance is possible even if the insulating layer is made thin, so that the container is ideal for portable use. However there are problems due to difficulties with manufacture and high cost. Furthermore, since the inner and outer walls are subjected to atmospheric pressure loadings, the shape of the inner and outer walls is restricted to a pressure resistant structure which can resist the atmospheric pressure loadings. It is therefore difficult to make a convenient rectangular box like shape container with plain walls.

SUMMARY OF THE INVENTION

It is an object of the present invention to provide an insulated container having low manufacturing cost, excellent insulating performance, and a high volumetric efficiency, and also to provide a method for its manufacture and a suitable insulating material therefor.

A first aspect of the present invention involves an insulated container made with an insulating layer between inner and outer walls of a double walled container with the inner and outer walls joined together as one, wherein an insulating material made by filling a bag with a low thermal conductivity gas comprising at least one of gases such as Xenon, Krypton and Argon is disposed between the inner and outer walls.

In a preferred embodiment of the insulated container, the bag may be made from a material selected from synthetic resin film, metal laminated synthetic resin film, and metal vapor deposited synthetic resin film. The thickness of the insulating material may be less than 5 mm. Within the space, several layers of insulating material of less than 5 mm in thickness can be arranged overlapped together. Moreover a soft foam type insulating material may be filled in the space between the inner and outer walls of the double walled container and the insulating material.

According to a second aspect of the present invention, the insulating material comprises a bag made from a film having gas barrier properties, which is filled with a low thermal conductivity gas of at least one of Xenon, Krypton and Argon.

In a preferred embodiment of the insulating material, the bag is made from a material selected from synthetic resin film, metal laminated synthetic resin film, and metal vapor deposited synthetic resin film. The inside of the bag may be formed with multi-layered pleats to prevent gas convection. Moreover, the insulating material may be made by overlapping together a plurality of bags respectively filled with a low thermal conductivity gas and with a thickness of each layer of less than 5 mm. The bag may be arranged between the walls of the double walled structure, and a soft foam type insulating material provided between the double walled structure and the bag.

A third aspect of the present invention involves a method of manufacturing an insulated container made with an insulating layer between inner and outer walls of a double walled container with the inner and outer walls joined together as one, wherein the inner and outer walls are joined together as one with the bag disposed beforehand in a space therebetween, and the bag is then filled with a low thermal conductivity gas of at least one of Xenon, Krypton and Argon, and sealed to form an insulating layer.

In a preferred embodiment of this method, the bag is made from a material selected from synthetic resin film, metal laminated synthetic resin film, and metal vapor deposited synthetic resin film. The thickness of the insulating layer may be made under 5 mm. A plurality of bags may be arranged overlapped together in the space between the inner wall and the outer wall, and these bags respectively filled with a low thermal conductivity gas to give a plurality of overlapped gas filled bags.

In a more preferred embodiment of this method, a tube shaped gas inlet may be provided in the bag, and an opening leading to the gas inlet provided in the double walled container, such that when the bag is arranged in the space between the inner wall and the outer wall, the gas inlet leads out from the opening in the double walled container. The bag arranged in the double walled container may thus be filled with a low thermal conductivity gas through the gas inlet, after which the gas inlet is sealed. The sealed gas inlet may then be inserted into the opening and the opening covered.

With the insulated container of the present invention, since the insulating material which comprises a bag filled with a low thermal conductivity gas of at least one of Argon, Xenon, and Krypton, is arranged in the space between the inner and the outer walls, then compared to existing insulated containers using foam type insulating materials, the insulating layer can be made thinner, and the volumetric efficiency of the insulated container improved. More specifically, compared to insulated containers using foam type insulating materials and the like, the thickness of the insulating layer can be reduced by more than half with the equivalent or greater insulating performance, and the volumetric efficiency can also be increased. Moreover, with the insulated container using urethane type foam as the insulating material, since the thermal resistance of urethane itself is poor, this cannot be used for thermos flasks and the like which take boiling water, even if a synthetic resin material of good thermal resistance is used in the inner and outer walls. The insulated container of the present invention can however also be used as a heat retaining container, since the inner and outer walls and the bag are all made of a synthetic resin or metal having good thermal resistance. Moreover by using a gas filled bag for the insulating material, the insulated container may be made lighter.

Furthermore, compared to the insulated containers with a vacuum insulating layer, since the inner and outer walls are not subjected to atmosphere pressure loadings, the insulated container does not need to have a pressure resistant structure. Therefore, the insulated container can be made thin and light weight and in various shapes such as a box like shape with plain walls.

Since a flexible insulating material is filled in the space between the inner and an outer walls and the bag, the insulating performance of the insulated container can be improved due to the effect of the flexible insulating material in offsetting the reduced insulating performance at the corners where the thickness of the bag is less.

With the method of manufacturing the insulated container of the present invention, since the inner and outer walls are joined together as one, with the bag disposed beforehand in a space therebetween, and the bag then filled with a low thermal conductivity gas and sealed, the bag can be fitted snugly into the space. Therefore, the bag can be installed even when the space is small or narrow. Moreover, compared to the foam material filling operation or the evacuation and sealing operation involved with the conventional insulated containers, the manufacturing operation for the insulated container is simple, involving merely filling the bag with a gas and sealing. Therefore, manufacturing operations for the insulated container can be improved, and since these operations are simplified, and foam material or evacuation equipment is not required, the manufacturing cost of the insulated container can be reduced.

DESCRIPTION OF THE PREFERRED EMBODIMENTS

As follows is a detailed description of the present invention based on embodiments thereof. The scope of the present invention however is not to be restricted to the disclosure of the embodiments. The disclosure of these embodiments is merely for example only, and it goes without saying that various modifications and alterations can be made thereto without exceeding the scope of the invention.

First Embodiment

Figure 1:
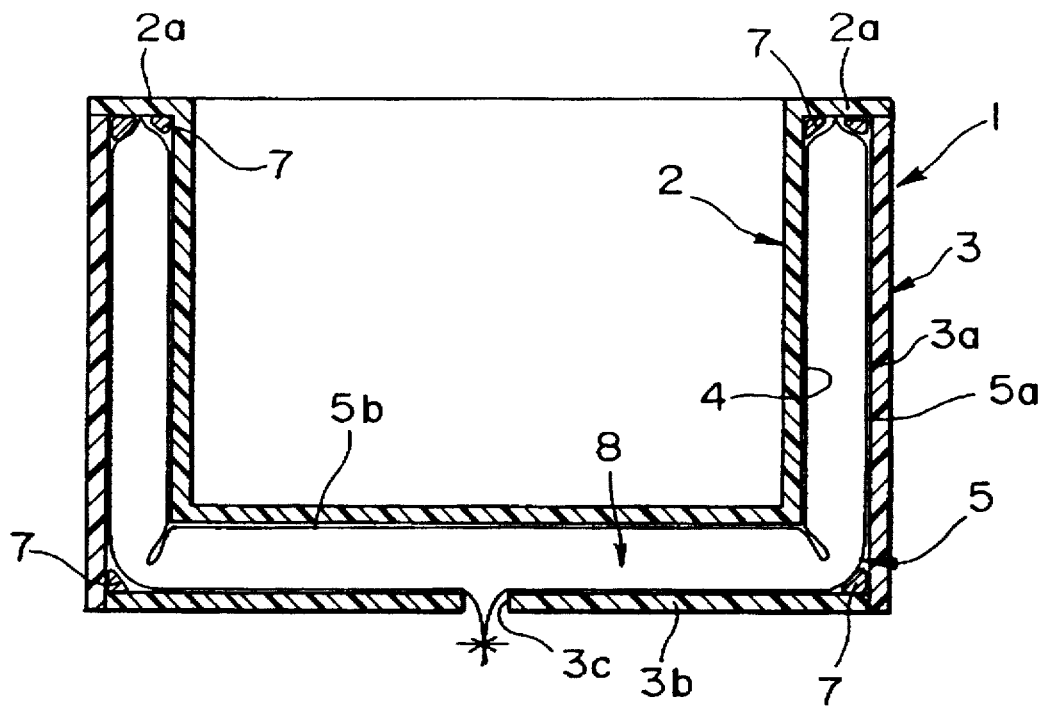
FIG. 1 is a longitudinal sectional view showing an example of an insulated container according to the present invention.
Figure 2:
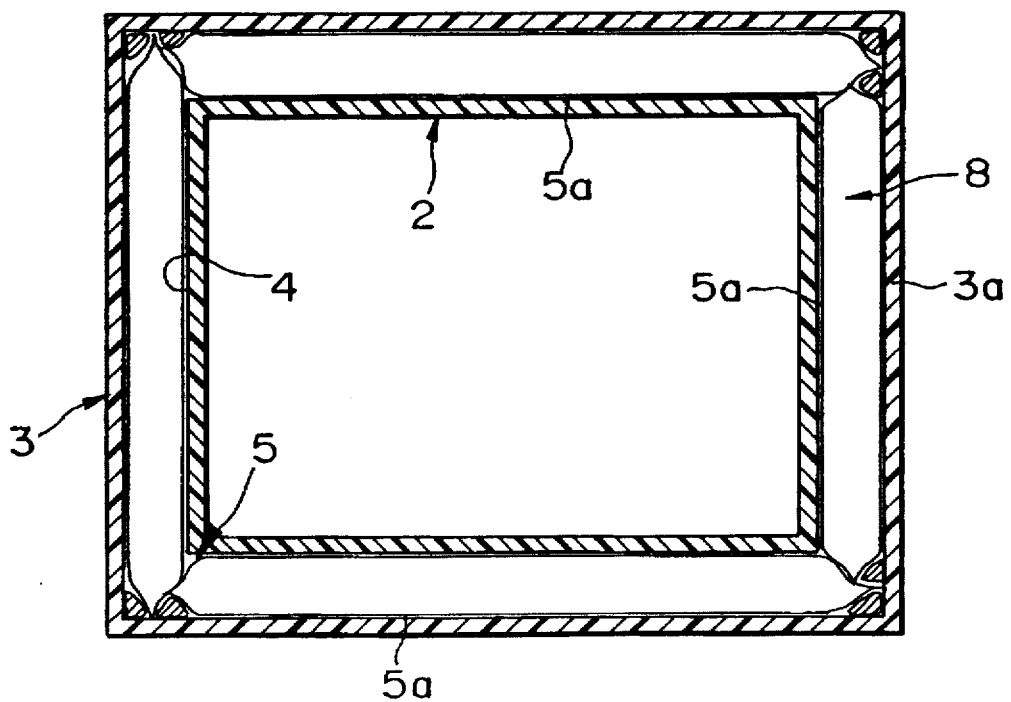
FIG. 2 is a transverse sectional view of the insulated container of FIG. 2.

FIGS. 1 and 2 show an example of an insulated container according to the present invention. The insulated container 1 comprises an inner wall 2, an outer wall 3 disposed around the inner wall 2, and a bag 5 (insulating material) which is arranged in a space 4 between the inner wall 2 and the outer wall 3. The bag 5 is filled with a low thermal conductivity gas comprising one of Argon, Xenon, or Krypton or a mixture of these at approximately atmospheric pressure, and then sealed. The inner wall 2 and outer wall 3 are joined together as one with a space therebetween to make up a double walled structure. The bag 5 is accommodated in the space 4 between the inner wall 2 and the outer wall 3 to thus form an insulating layer 8. The thickness of the insulating layer 8 is made less than 5 mm so as to restrict convection of the gas inside the bag 5.

The low thermal conductivity gas has a thermal conductivity k smaller than that of air ($2.41 \times 10^2$ $W \cdot m^{-1} \cdot K^{-1}$; 0° C.). For this gas an inert gas such as Xenon (k=$0.52 \times 10^2$ $W \cdot m^{-1} \cdot K^{-1}$; 0° C.), Krypton (k=$0.87 \times 10^2$ $W \cdot m^{-1} \cdot K^{-1}$; 0° C.), Argon (k=$1.63 \times 10^2$ $W \cdot m^{-1} \cdot K^{-1}$; 0° C.), or a mixture of these gases may be used. Of the inert gases, Xenon, Krypton, and Argon gas are particularly suitable since they have low thermal conductivity and present minimal problems to the environment.

The inner wall 2 and outer wall 3 are manufactured from a synthetic resin material such as ABS resin, polypropylene, polyethylene, polyethylene-terephthalate, polycarbonate, polystyrene, acrylic resin, or rigid PVC. However the material for the walls 2 and 3 is not limited to synthetic resins, and may be a metal material such as stainless steel. Moreover one wall may be made of a synthetic resin and the other of a metal.

The inner wall 2 is formed in a box like shape with an open top end and a closed bottom end. A flange 2a is formed on the top end of the inner wall 2. The outer wall 3 comprises a rectangular sleeve shaped side wall 3a, with a base plate 3b joined to a lower edge thereof. The side wall 3a is disposed around the inner wall 2, with an upper edge of the side wall 3a joined as one to the lower face of the outer rim portion of the flange 2a of the inner wall 2. The joint between the upper edge of the side wall 3a and the lower face of the outer rim portion of the flange 2a, and the joint between the lower edge of the side wall 3a and the base plate 3b is made using a jointing method involving one of; an adhesive, heated fusion, or ultrasonic welding. A circular shaped aperture 3c is formed in a middle portion of the base plate 3b of the outer wall 3. This aperture 3c may be blocked by a stopper or a lid.

A metal coating may be provided on the inside of the outer wall 3 and on the outside of the inner wall 2 to minimize thermal radiation. This metal coating can be formed by a method or a combination of two methods selected from methods such as; vacuum vapor deposition, chemical plating, and electroplating, using a metal such as copper, silver, aluminum or chrome or an alloy thereof.

Figure 3:
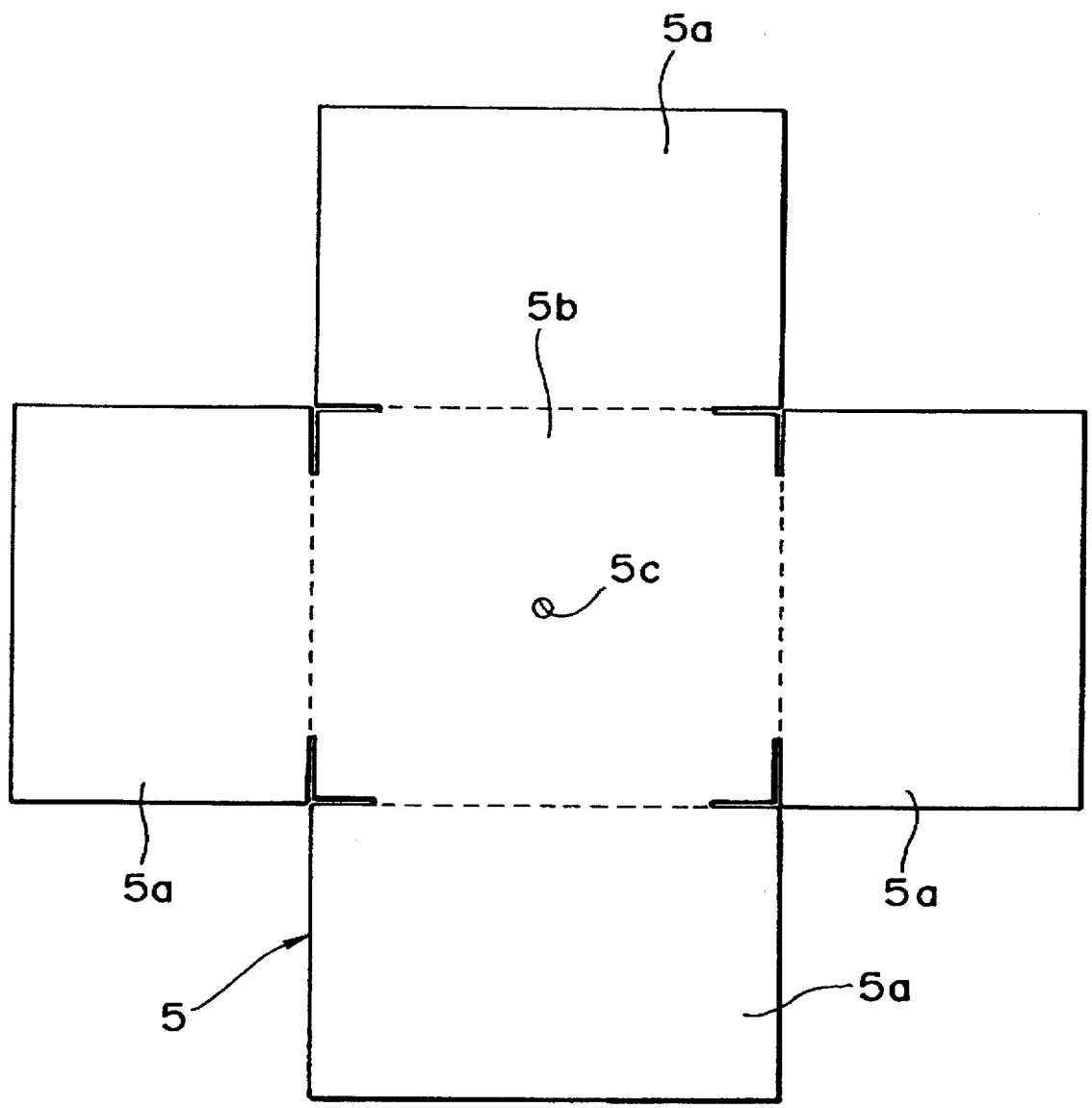
FIG. 3 is a development view of a bag.

The bag 5 which is inserted into the space 4 between the inner wall 2 and the outer wall 3 is shown in the development view of FIG. 3. It is formed with a rectangular shaped bottom portion 5b having side portions 5a connected to the four edges thereof. A gas inlet 5c which extends out in the form of a tube, is provided in a central portion on the bottom face of the bottom portion 5b. The bag can be made from a synthetic resin film, a metal laminated synthetic resin film, or a metal vapor deposited synthetic resin film. The material of the synthetic resin film will preferably have a low gas radiation amount and gas permeability, and a high rigidity. For example, it may be selected from materials such as; polypropylene, polyethyleneterephthalate, polyester, polycarbonate, polystyrene, rigid PVC, polyamide and the like. The thickness of the synthetic resin film is preferably from 0.05–1.0 mm. With the metal laminated film, this is made by laminating a metal foil such as aluminum foil with a synthetic resin film. With the metal vapor deposited synthetic resin film, this is made by vapor depositing a metal such as aluminum onto a synthetic resin film.

The bag 5 is filled through the gas inlet 5c with a low thermal conductivity gas of one or a mixture of the above-mentioned low thermal conductivity inert gases of Argon, Xenon, and Krypton, and is then sealed. With this operation the four side portions 5a are erected to give the form of box having a bottom, and of a size so as to be accommodated within the space 4 between the inner wall 2 and the outer wall 3.

The corners in the space between the inner wall 2 and outer wall 3 into which the sealed gas bag 5 cannot reach are filled with a flexible foam type insulating material 7 such as soft urethane foam.

An example of a method of manufacturing the insulated container 1 will now be explained with reference to the drawings.

Figure 4:
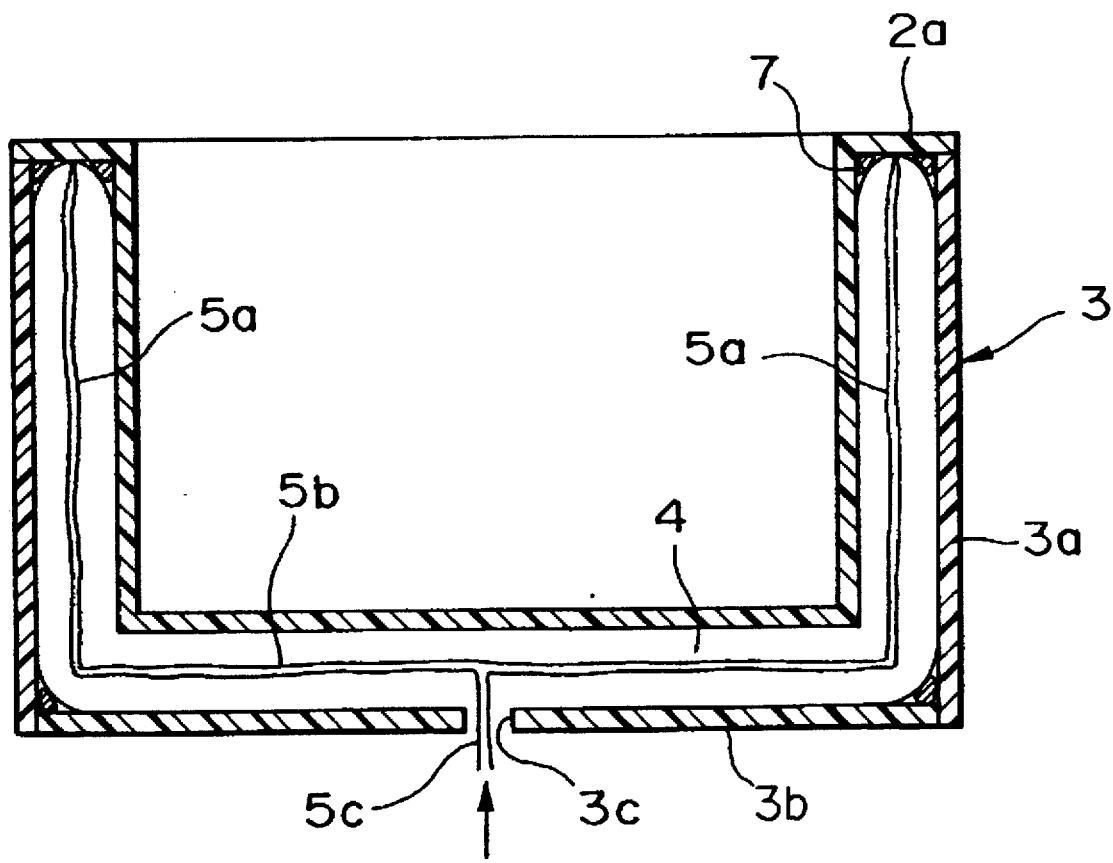
FIG. 4 is a longitudinal sectional view for explaining a method of manufacturing the insulated container of FIG. 1, showing a condition of the bag prior to filling with a gas.

The synthetic resin inner wall 2 and the outer wall 3 are first made up, and the bag 5 prepared. An edge portion of the bag is adhered beforehand to the lower face of the flange 2a of the inner wall 2. The lower face of the outer rim portion of the flange 2a of the inner wall 2 and the upper edge of the side wall 3a of the outer wall 3 are then joined together with an adhesive such as an epoxy resin. The corners of the space 4 between the inner wall 2 and an outer wall 3 are then filled with a foam insulating material 7. Then with the unfilled gas bag installed in the space 4 between the inner wall 2 and the outer wall 3 as shown in FIG. 4, the base plate 3b is joined with an adhesive such as an epoxy resin to the lower edge of the side wall 3a of the outer wall 3. At this time the gas inlet 5c of the bag 5 passes out through the aperture 3c in the base plate 3b. A low thermal conductivity gas such as Argon, Xenon, or Krypton or a mixture of these gases is then introduced into the bag 5 through the gas inlet 5c, which is then sealed with an adhesive or by heat sealing. The sealed gas inlet 5c is then placed in the base plate 3b inside of the aperture 3c which is then blocked with a stopper or a lid.

With such an insulated container 1, since the bag 5 (insulating material) which is filled with a gas having a lower thermal conductivity than that of air, is arranged in the space 4 between the inner wall 2 and the outer wall 3, then compared to the foam type insulated container, the insulating layer 8 can be made thinner, and the volumetric efficiency of the insulated container 1 improved. More specifically, compared to insulated containers using foam type insulating materials and the like, the thickness of the insulating layer 8 can be reduced by more than half with the equivalent or greater insulating performance, and the inside volume can also be increased by the amount of reduced thickness. Moreover, with the insulated container using urethane type foam as the insulating material, since the thermal resistance of urethane itself is poor, this cannot be used for thermos flasks and the like which take boiling water, even if a synthetic resin material of good thermal resistance is used in the inner wall 2 and the outer wall 3. The insulated container 1 of the present embodiment can however also be used as a heat retaining container, since the inner wall 2 and the outer wall 3 and the bag 5 are all made of a synthetic resin having good thermal resistance. Moreover by using the gas filled bag 5 for the insulating material, the insulated container may be made lighter.

Furthermore, compared to the insulated containers with a vacuum insulating layer, since the inner wall 2 and the outer wall 3 are not subjected to atmosphere pressure loadings, the insulated container 1 does not need to have a pressure resistant structure. Therefore, the insulated container can be made thin and light weight and in various shapes such as a box like shape with plain walls.

Since the flexible insulating material 7 is filled in the space between the inner wall 2 and the outer wall 3 and the bag 5, the insulating performance of the insulated container 1 can be improved due to the effect of the flexible insulating material 7 in offsetting the reduced insulating performance at the corners where the thickness of the bag 5 is less.

Moreover, with the method of manufacturing the insulated container 1 of the present embodiment, since the inner wall 2 and the outer wall 3 are joined together as one, with the bag 5 disposed beforehand in a space 4 therebetween, and the bag 5 then filled with a low thermal conductivity gas and sealed, the bag 5 can be fitted snugly into the space 4. Therefore, the bag 5 can be installed even when the space is small or narrow. Moreover, compared to the foam material filling operation or the evacuation and sealing operation involved with the conventional insulated containers, the manufacturing operation for the insulated container 1 is simple, involving merely filling the bag 5 with a gas and sealing. Therefore, manufacturing operations for the insulated container 1 can be improved, and since these operations are simplified, and foam material or evacuation equipment is not required, the manufacturing cost of the insulated container 1 can be reduced.

Figure 6:
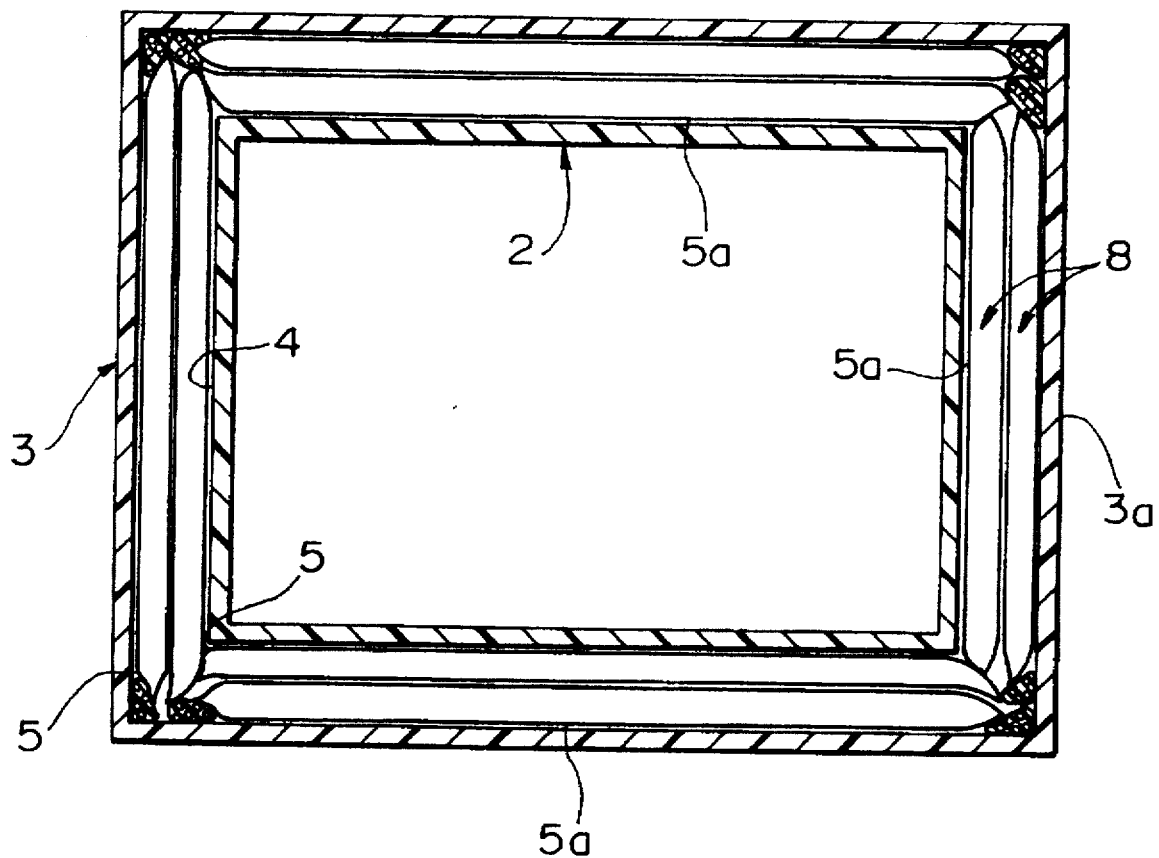
FIG. 6 is a transverse sectional view of a further embodiment of insulated container.

FIG. 6 shows an embodiment wherein the space 4 is filled with a plurality, here shown as two, of layers of bags 5 which overlie one another.

With the insulated container 1 of this embodiment, a single bag 5 is accommodated in the space 4 between the inner wall 2 and the outer wall 3. However this bag 5 may be made from a plurality of layers. By having such a construction with layers of bags 5, convection and thermal radiation of the gas in the bag can be minimized. As a result, the insulation performance of the bag can be improved. When the construction involves a plurality of bags, the respective bags may be filled with gas from a single gas inlet 5c. Moreover, in order to prevent convection of the gas, the thickness of the bags in the respective layers should be made less than 5 mm. Furthermore, an insulating material having multi-layered pleats on the inside to prevent convection may be used for the bag 5.

Second Embodiment

Figure 5:
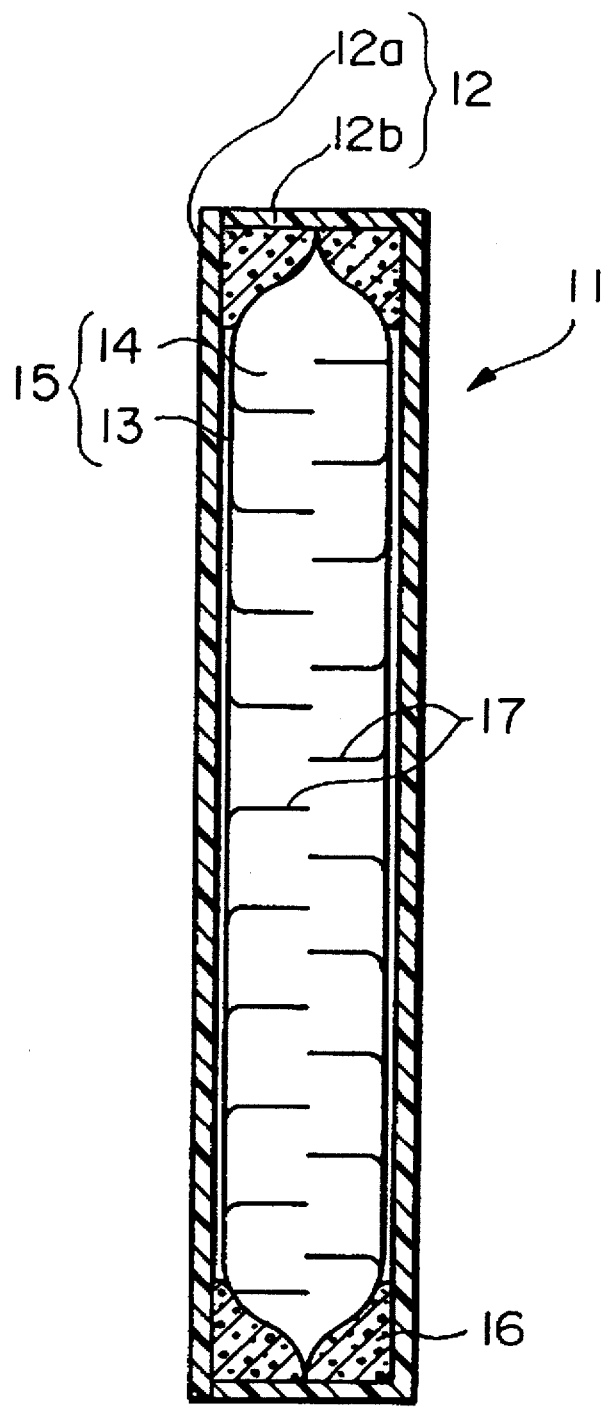
FIG. 5 is a cross sectional view showing an insulated panel being an example of an insulating material according to the present invention.

FIG. 5 shows an example of an insulating material of the present invention in the form of an insulating panel 11. The insulating panel 11 is constructed by inserting between the walls of a double walled casing 12 made of a synthetic resin, an insulating material 15 comprising a bag 13 made from a film having gas barrier properties which has been filled with a gas 14 of a thermal conductivity less than that of air. Moreover urethane foam 16 is filled into the spaces in the insulating panel 11, between the insulating material 15 and the inner face of the double walled casing 12. Furthermore, multi-layered pleats 17 for preventing convection are provided on the inner face of the bag 13 of the insulating material 15.

Figure 7:
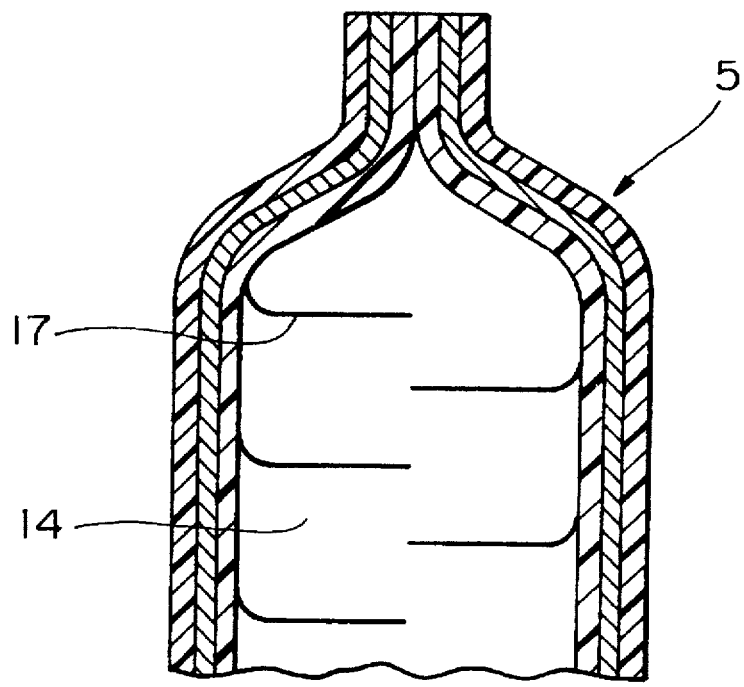
FIG. 7 is a cross-sectional view of another embodiment of insulated panel.
Figure 8:
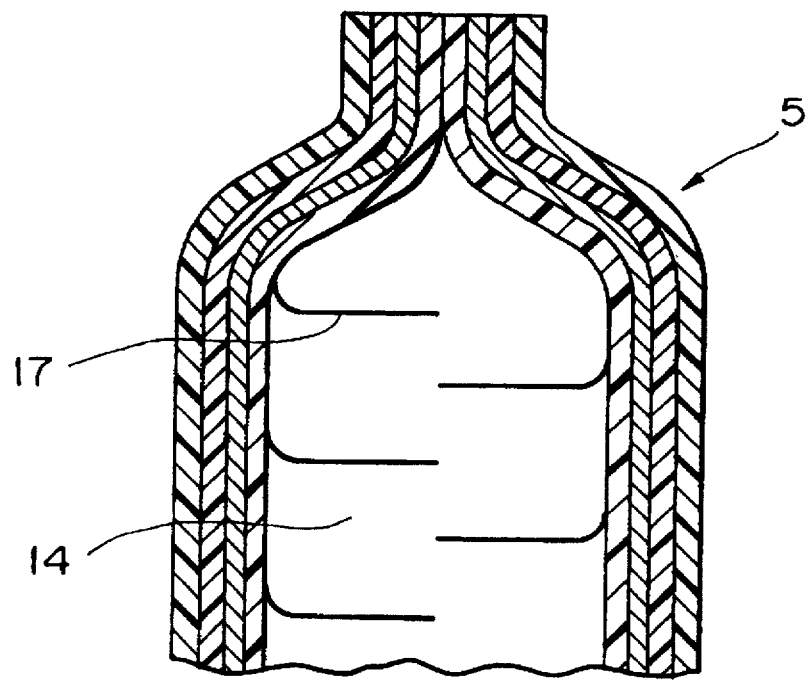
FIG. 8 is a cross-sectional view of still a further embodiment of insulated panel.

The bag 13 can be made from a synthetic resin film, such as shown in FIG. 5, a metal laminated synthetic resin film such as shown in FIG. 7, or a metal vapor deposited synthetic resin film. The material of the synthetic resin film, such as shown in FIG. 8, will preferably have a low gas radiation amount and gas permeability, and a high rigidity. For example, it may be selected from materials such as polypropylene, polyethyleneterephthalate, polyester, polycarbonate, polystyrene, rigid PVC, polyamide and the like. The thickness of the synthetic resin film is preferably from 0.05–1.0 mm. With the metal laminated film, this is made by laminating a metal foil such as aluminum foil with a synthetic resin film. With the metal vapor deposited synthetic resin film, this is made by vapor depositing a metal such as aluminum onto a synthetic resin film.

The gas 14 which is filled into the bag 13, has a thermal conductivity k smaller than that of air ($2.41 \times 10^2$ $W \cdot m^{-1} \cdot K^{-1}$; 0° C.). For this gas an inert gas such as Xenon (k=$0.52 \times 10^2$ $W \cdot m^{-1} \cdot K^{-1}$; 0° C.), Krypton (k=$0.87 \times 10^2$ $W \cdot m^{-1} \cdot K^{-1}$; 0° C. Argon (k=$1.63 \times 10^2$ $W \cdot m^{-1} \cdot K^{-1}$; 0° C.), or a mixture of these gases may be used. Of the inert gases, Xenon, Krypton, and Argon gas are particularly suitable since they have low thermal conductivity and present minimal problems to the environment.

Moreover, the thickness of the insulating material 15 is made less than 5 mm. This is because if the thickness is greater than 5 mm, there is the likelihood of convection of the interior gas 14 resulting in a deterioration of the insulating efficiency due to an increase in the conduction amount in the direction of the thickness of the insulating material 15. Moreover, if made thicker the effective improvement in volumetric efficiency by the insulating material 15 will be reduced.

The insulating material 15 is not limited to a single material, and can be used as several sheets overlapped with each other. Moreover, this can be used overlapped together with the conventional urethane foam and polystyrene foam.

In the manufacture of the insulating panel 11, at first the synthetic resin walls 12a, 12b are made by a suitable process such as injection molding and the like. Then at the time of assembling these together to join the edges and form the double walled casing 12, either a separately manufactured insulating material 15, or a bag 13 which has not yet been filled with gas, is inserted between the two walls 12a, 12b which are then joined together as one. A gas such as Xenon is then filed into the bag 13 from a previously installed gas inlet which is then sealed to complete the manufacture.

The bag 13 is made by attaching multi-layered pleats 17 to one face of a synthetic resin film. Respective faces of two layers of film having the multi-layered pleats 17 are then positioned so as to face each other, and the peripheral edges of the film heat sealed together.

The insulating panel 11 constructed in this manner, can be used as an insulating material for various types of heat or cold retaining containers such as a cooler box, or an insulated lunch box, as well as an insulating material for use in various types of structures such as general houses and buildings.

When a gas of an extremely low thermal conductivity such a Xenon is used as the gas filled into the insulating panel 11, then an equivalent or greater insulating performance can be obtained compared to the conventional urethane foam insulation, with approximately half the thickness. Therefore, the thickness of the insulation portion can be reduced, resulting in a thin type light weight insulating panel.

Moreover by making the thickness of the insulating material less than 5 mm, and providing convection inhibiting multi-layer pleats on the inner walls of the film of the bag, the insulating performance of the bag can be improved due to minimal gas convection inside the bag.

The present embodiment is constructed with the insulating material 15 inserted inside the double walled casing 12 made of a synthetic resin to form a panel shaped insulating panel 11. However the invention is not limited to this arrangement, and can also be applied to double walled structures and multi-walled structures of various shapes. Moreover, the bag 13 and the insulating panel 11 can be used overlapped in two or more layers. While this will result in an increase in thickness, the insulating performance will be appreciably increased.

What is claimed is:

1. An insulated double-wall container comprising:
   a first wall opposing a second wall that are joined to form a space therebetween, and
   a bag of gas impervious material selected from synthetic resin film, metal laminated synthetic resin film, and metal, vapor deposited synthetic resin film containing a gas having a thermal conductivity less than that of air in said space between said first and second walls forming a thermal insulating barrier between said first and second walls, said bag being formed with internal multi-layered pleats to retard convective thermal transfer by retarding gas convection.

2. An insulated container according to claim 1, wherein said bag in said space when filled with the gas has a thickness of less than 5 mm.

3. An insulated container according to claim 1, wherein a plurality of layers of insulating material are arranged in an overlapping manner.

4. An insulated container according to claim 1, further comprising a pliable foam-type insulating material in a space between the walls of the double-walled container and the bag.

5. An insulated double wall container as in claim 1, wherein each of said first wall and second wall is of synthetic resin.

6. An insulated container as in claim 1, wherein said gas comprises at least one of argon, xenon and krypton.

7. A thermal insulating barrier comprising a gas-containing bag of a material having gas-barrier properties selected from one of metallic laminate synthetic resin film and metal vapor deposited synthetic resin film, the gas in the bag being of low-thermal-conductivity comprising at least one of xenon, krypton, and argon, said gas filled bag formed with internal multilayered pleats for the retardation of gas convection and having a thickness when filled with the gas of less than 5 mm.

8. A thermal insulating barrier according to claim 7, wherein the gas filled bag is arranged between walls of a double walled structure, and a pliable foam-type insulating material is provided in the space between said gas filled bag filled with said low thermal conductivity gas and between both walls of said double-walled structure.

* * * * *